United States Patent
Panchapakesan et al.

(10) Patent No.: US 11,063,922 B2
(45) Date of Patent: Jul. 13, 2021

(54) VIRTUAL CONTENT REPOSITORY

(71) Applicant: AirWatch LLC, Atlanta, GA (US)

(72) Inventors: Ramani Panchapakesan, Bangalore (IN); Gangadhar Nittala, Bangalore (IN)

(73) Assignee: AIRWATCH LLC, Atlanta, GA (US)

(*) Notice: Subject to any disclaimer, the term of this patent is extended or adjusted under 35 U.S.C. 154(b) by 259 days.

(21) Appl. No.: 15/879,690

(22) Filed: Jan. 25, 2018

(65) Prior Publication Data

US 2018/0152434 A1  May 31, 2018

Related U.S. Application Data

(63) Continuation of application No. 14/740,310, filed on Jun. 16, 2015, now Pat. No. 9,906,510.

(51) Int. Cl.
*H04L 29/06* (2006.01)

(52) U.S. Cl.
CPC .......... *H04L 63/08* (2013.01); *H04L 63/0428* (2013.01); *H04L 63/20* (2013.01)

(58) Field of Classification Search
CPC ........ G06F 21/60; G06F 21/62; G06F 21/604; G06F 21/6209; G06F 21/6208; G06F 3/0601; G06F 3/0622; G06F 3/0635; G06F 3/0637; G06F 3/067; G06F 3/1097; H04L 67/1097
See application file for complete search history.

(56) References Cited

U.S. PATENT DOCUMENTS

| | | | | |
|---|---|---|---|---|
| 5,560,008 A | * | 9/1996 | Johnson | G06F 21/6218 709/229 |
| 7,185,011 B1 | * | 2/2007 | Dujari | G06F 21/51 |
| 7,536,507 B1 | * | 5/2009 | Wagner | G06F 3/0619 711/114 |
| 7,926,087 B1 | * | 4/2011 | Holl, II | H04L 67/1097 726/2 |
| 2003/0033367 A1 | * | 2/2003 | Itoh | H04L 67/34 709/203 |
| 2003/0191938 A1 | * | 10/2003 | Woods | G06F 21/6209 713/165 |
| 2006/0253484 A1 | * | 11/2006 | Bangalore | G06F 16/1847 |
| 2009/0222509 A1 | * | 9/2009 | King | G06F 16/182 709/203 |

(Continued)

OTHER PUBLICATIONS

Non-Final Office Action dated Oct. 12, 2016 (U.S. Appl. No. 14/740,310).

(Continued)

*Primary Examiner* — Richard A McCoy
(74) *Attorney, Agent, or Firm* — Thomas Horstemeyer, LLP

(57) ABSTRACT

Disclosed are various examples for facilitating access to files in a virtual content repository. In one example, a request to access a file is transmitted to a management service. The request includes a first authentication credential for a first user account associated with the management service. Storage plan data is received that identifies a content repository and a second authentication credential for a second user account associated with the content repository. The client device authenticates with the content repository using the storage plan data, and access to the file is provided.

20 Claims, 9 Drawing Sheets

(56) References Cited

U.S. PATENT DOCUMENTS

| | | | |
|---|---|---|---|
| 2009/0222896 A1* | 9/2009 | Ichikawa | G06F 9/4416 |
| | | | 726/6 |
| 2009/0271412 A1* | 10/2009 | Lacapra | G06F 3/067 |
| 2011/0184993 A1* | 7/2011 | Chawla | G06F 9/45533 |
| | | | 707/802 |
| 2011/0258224 A1* | 10/2011 | Hagerty | G06F 16/21 |
| | | | 707/769 |
| 2012/0331088 A1* | 12/2012 | O'Hare | G06F 21/6227 |
| | | | 709/214 |
| 2013/0227047 A1* | 8/2013 | Dolce | G06F 3/067 |
| | | | 709/213 |
| 2015/0281356 A1* | 10/2015 | Maturana | H04L 67/1097 |
| | | | 709/217 |
| 2015/0324592 A1* | 11/2015 | Dutta | H04L 63/0428 |
| | | | 713/165 |

OTHER PUBLICATIONS

Final Office Action dated Jun. 6, 2017 (U.S. Appl. No. 14/740,310).

* cited by examiner

VIRTUAL CONTENT REPOSITORY

CROSS-REFERENCE TO RELATED APPLICATIONS

This application is a continuation of and claims priority to application Ser. No. 14/740,310, filed on Jun. 16, 2015 and titled "VIRTUAL CONTENT REPOSITORY," which is incorporated by reference herein in its entirety.

BACKGROUND

Some data storage providers operate data centers where data storage is allocated for several users. A user can store and retrieve data, such as images, videos, and word processing documents using one or more client devices that communicate with a data storage system over a network. The data storage provider may charge a fee to the user based on the amount of data being stored by the data storage system and/or the number of times that the user accesses the stored data.

In an enterprise environment, users can also be allocated storage in an enterprise storage system. Data stored in the enterprise storage system can be stored in data centers operated by the enterprise. As the number of users and the data storage needs within an enterprise grow, resources may need to be added to the data centers operated by the enterprise. Accordingly, an enterprise may wish to outsource its data storage needs to support the enterprise storage system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to storing and retrieving files using data storage systems that are accessible to client devices over a network. In one example, a file management application executing on a client device transmits a request to store a file in a virtual content repository associated with the user. The virtual content repository can be assigned to a user by an enterprise and can be managed by a virtual content repository application. Files can actually be stored in other data stores or content repositories provided by an entity that is not controlled by the user of the client device and/or the enterprise, such as by a public cloud storage provider. In one example, a client device associated with a particular user can transmit a request to store a file in the virtual content repository, and in response, a virtual content repository application can generate a storage plan for the file that identifies one or more of the content repositories in which the file or portions of the file can be stored. The storage plan can be provided to the client device, which can store the file in the one or more content repositories according to the storage plan. Accordingly, the content repositories can be assigned to a user account that is separate from an enterprise user account of a particular user.

In one scenario, the content repositories can be associated with personal user accounts of the user that are separate from an enterprise user account associated with the user. The virtual content repository application can then maintain information about the file stored according to the storage plan, such as its storage location and other metadata associated with the file. A client device can transmit a request to retrieve a particular file to the virtual content repository application, which can identify a storage plan by which the file was stored in one or more content repositories associated with the user. The virtual content repository can transmit the storage plan to the client device, which can in return retrieve the file from the content repositories. Accordingly, examples of the present disclosure provide a mechanism for a client device to store files in a virtual content repository associated with a first user account, such as an enterprise user account, that are linked with various content repositories associated with one or more other user accounts that are different from the first user account.

Figure 1:
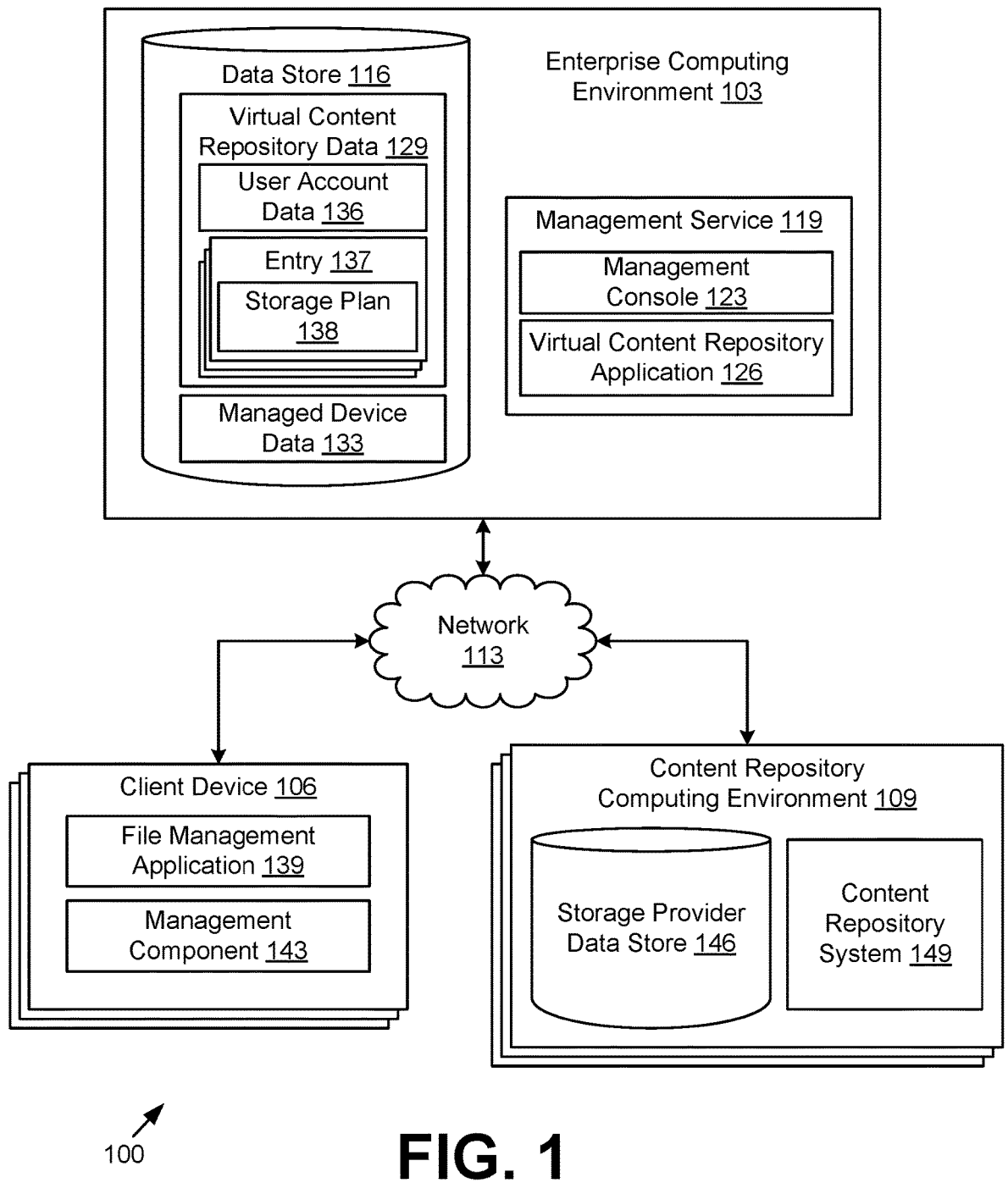
FIG. 1 is a drawing of a networked environment according to various examples.

With reference to FIG. 1, shown is a networked environment 100 according to various examples. The networked environment 100 shown in FIG. 1 includes an enterprise computing environment 103, a client device 106, a content repository computing environment 109, and potentially other components, which are in data communication with each other over a network 113. The network 113 includes, for example, the Internet, one or more intranets, extranets, wide area networks (WANs), local area networks (LANs), wired networks, wireless networks, other suitable networks, or any combination of two or more such networks. The networks can include satellite networks, cable networks, Ethernet networks, telephony networks, and/or other types of networks.

The enterprise computing environment 103 can include, for example, a server computer or any other system providing computing capabilities. Alternatively, the enterprise computing environment 103 can employ multiple computing devices that can be arranged, for example, in one or more server banks, computer banks, or other arrangements. The computing devices may be located in a single installation or distributed among many different geographical locations. For example, the enterprise computing environment 103 can include multiple computing devices that together form a hosted computing resource, a grid computing resource, and/or any other distributed computing arrangement. In some cases, the enterprise computing environment 103 can operate as at least a portion of an elastic computing resource where the allotted capacity of processing, network, storage, or other computing-related resources can vary over time. The enterprise computing environment 103 can also include or be operated as one or more virtualized computer instances that are executed in order to perform the functionality that is described herein. Generally, the enterprise computing environment 103 is operated in accordance with particular security protocols and is considered a trusted computing environment.

Various systems can be executed in the enterprise computing environment 103. Also, various data is stored in a data store 116 that is accessible to the enterprise computing environment 103. The data store 116 shown in FIG. 1 can be representative of multiple data stores 116. The data stored in the data store 116 is associated with the operation of the various components described below.

A management service 119 and/or other systems can be executed in the enterprise computing environment 103. The management service 119 can be executed to manage and/or oversee the operation of multiple client devices 106. In some examples, an enterprise, such as one or more companies or other organizations, can operate the management service 119 to oversee and/or manage the operation of the client devices 106 of its employees, contractors, and customers. Accordingly, the management service 119 is considered a trusted system.

The management service 119 can include a management console 123, a virtual content repository application 126, and/or other components. The management console 123 can facilitate administration of devices of an enterprise by administrators via the management service 119. For example, the management console 123 can generate one or more user interfaces that are rendered on a display device to facilitate interaction with the management service 119. The user interfaces can facilitate an administrator's inputting of commands or other information for the management service 119. Additionally, the user interfaces can include presentations of statistics or other information regarding the client devices 106 that are managed by the management service 119.

The virtual content repository application 126 can obtain and store information regarding files that are associated with one or more client devices 106 and/or the management service 119. For example, the virtual content repository application 126 can manage, on behalf of a user, a virtual content repository whereby files associated with a virtual content repository of a user are stored in third party content repositories that can exist outside enterprise computing environment 103, such as those represented by the one or more content repository computing environment 109. In other words, the virtual content repository application 126 can track file activity and store information regarding the locations, encryption keys, user permissions (e.g., access rights), the file version, access history, and/or other information of files.

The data stored in the data store 116 can include virtual content repository data 129, managed device data 133, and/or other information. The virtual content repository data 129 can include data for each user of an enterprise. In other words, the virtual content repository data 129 can store data from which a virtual content repository can be constructed as well as managed on behalf of a user of the enterprise. The virtual content repository data 129 can include a directory structure along with filenames associated with files stored in a virtual content repository on behalf of one or more users associated with an enterprise user account. The directory structure can represent files that are stored by the user in his or her virtual content repository where the files are actually housed in a content repository that is external to the enterprise computing environment 103. In other words, a user can store files in his or her virtual content repository associated with his or her enterprise user account with the files being accessible through the file management application 139. However, the files are actually stored in a content repository external to enterprise computing environment 103.

In one example, the virtual content repository data 129 includes user account data 136 associated with a particular virtual content repository. The user account data 136 identifies an enterprise user account, or an account within the enterprise computing environment 103, associated with a particular virtual content repository. The user account data 136 can also include data identifying content repositories that are external to the enterprise computing environment 103, such as third party or publicly accessible content repositories or data storage services. These content repositories can be leveraged by the virtual content repository application 126 to facilitate a virtual content repository that is associated with an enterprise user account of a particular user. The user account data 136 can also include one or more authentication credentials associated with the content repositories external to the enterprise computing environment 103 that can be provided by a user associated with the enterprise user account. In one example, an authentication credential can be provided by or on behalf of a user upon identifying a content repository external to the enterprise computing environment 103 to which the user has access. The user can identify the content repository using the file management application 139 or through any other user interface generated by the virtual content repository application 126. In another scenario, the virtual content repository application 126 can generate an account in a third party content repository and authentication credentials for the account on behalf of a user. The virtual content repository application 126 can then associate the account and authentication credentials with the user account data 136 corresponding to the user.

For example, such an authentication credential can include a username/password combination or an authentication token associated with a third party content repository of the user, where a user account associated with the third party content repository is different from a user account associated with the enterprise computing environment 103, or an enterprise user account. The virtual content repository application 126 can access a content repository of the user in a content repository computing environment 109 using the authentication credential in order to access files, assess storage levels, storage quotas, or obtain a directory or listing of files stored within the content repository.

The virtual content repository data 129 also includes an entry 137 for files stored by a user in his or her virtual content repository. The files are actually stored in an external content repository on behalf of the user. In some examples, an entry 137 can include data that represents, for example, a unique identifier and the storage location within a content repository. Entry 137 also includes the filename of the file within the content repository, the filename of the file within the virtual content repository, an encryption key, permissions, the file version, access history, and/or other information for a particular file. The filenames in the enterprise computing environment 103 and the content repository computing environment 109 can be the same or different for corresponding file copies.

The managed device data 133 can include information regarding the client devices 106 that are managed and/or controlled by the management service 119. The managed device data 133 for a particular client device 106 can include, for example, the identification of a user assigned to the client device 106, the identification of applications that are installed in the client device 106, historical data regarding the operation of the client device 106, and/or other information.

In addition, the managed device data 133 for a particular client device 106 can include one or more device profiles. A device profile can include a set of one or more compliance rules that can be specified by the management service 119. The compliance rules can specify one or more conditions that must be satisfied for a client device 106 to be deemed compliant. For example, a compliance rule can specify that particular applications are prohibited from being installed on a client device 106. As another example, a compliance rule can specify that a lock screen is required to be generated when the client device 106 is "awoken" from a low power (e.g., "sleep") state and that a passcode is required for a user to unlock the lock screen. Additionally, one or more compliance rules can be based on time, geographical location, and/or other predefined conditions. When the compliance rules for a particular device profile are satisfied, the management service 119 can deem the corresponding client device 106 as being compliant with the device policy.

The client device 106 can be representative of multiple client devices 106 that can be coupled to the network 113. The client device 106 can include, for example, a processor-based system such as a computer system. Such a computer system can be embodied in the form of a desktop computer, a laptop computer, a personal digital assistant, a mobile phone (e.g., a "smartphone"), a set-top box, a music player, a web pad, a tablet computer system, a game console, an electronic book reader, or any other device with like capability. The client device 106 can include a display as well as one or more input devices, such as a mouse or touch pad that facilitates a user input.

The client device 106 can execute a file management application 139, a management component 143, and/or other components. The file management application 139 can include, for example, one or more programs that access, manage, edit, and/or perform other functions with respect to files. As examples, a file can include an image, a video, a word processing document, or a spreadsheet. In some examples, the file management application 139 can be regarded as being a "content locker," because the file management application 139 can cause access to one or more of the files to be restricted. For example, the file management application 139 can require that a user provide authentication credentials to access files that are available through the file management application 139. As another example, the file management application 139 can restrict accessibility of files to certain permitted applications on the client device 106 and prevent other applications from accessing files that are available through the file management application 139.

The file management application 139 can generate one or more user interfaces that present the files. For example, the file management application 139 can render files, such as images or videos. In addition, one or more user interfaces for the file management application 139 can facilitate a user editing a file, such as a word processing document, spreadsheet, or image. In addition, one or more user interfaces for the file management application 139 can facilitate a user transmitting a file to other client devices 106, the management service 119, or other systems. The file management application 139 can also facilitate creating files to be stored in a virtual content repository provided by the virtual content repository application 126, where the files can be stored in an external content repository associated with a user account of a user.

The client device 106 can execute the management component 143 to monitor and/or manage at least a portion of the data, applications, or hardware components for the client device 106. The management component 143 can also identify whether the client device 106 complies with the compliance rules for device profiles that have been assigned to the client device 106. In some examples, the management component 143 can function as a management service that operates as a portion of an operating system for the client device 106. In other examples, the management component 143 can function as a device management agent that operates in the application layer of the client device 106 and that monitors at least some of the activity being performed in the client device 106. In other examples, the management component 143 can include an application wrapper that interfaces with a software component to facilitate overseeing, monitoring, and/or managing one or more resources of the client device 106. Alternatively, the management component 143 can be a portion of an application that was developed, for example, using a Software Development Kit (SDK) that facilitates the inclusion of functionality within the application that monitors and/or manages at least a portion of the resources for the client device 106.

The client device 106 can execute the management component 143 automatically upon startup of the client device 106. Additionally, the management component 143 can run as a background process in the client device 106. Accordingly, the management component 143 can execute without user intervention in some examples. Additionally, the management component 143 can communicate with the management service 119 to facilitate the management service 119 managing the client device 106. For example, the management component 143 can obtain compliance rules from the management service 119, and the management component 143 can determine whether the client device 106 operates according to the compliance rules. In another example, the management component 143 transmits data that indicates the status of settings for the client device 106, and the management service 119 uses this data to determine whether the client device 106 operates according to the compliance rules. If the client device 106 is not in compliance, the management component 143 or the management service 119 causes a remedial action to be performed. Examples of remedial actions include notifying a user of the device or an administrator of the management service 119, causing device settings to be changed so that the client device 106 becomes compliant with the compliance rules, and erasing data, such as enterprise data, from the client device 106. Enterprise data includes, for example, email, contacts, files or other data that is associated with the enterprise and accessible through the management service 119.

The content repository computing environment 109 can include, for example, a server computer or any other system providing computing capabilities. Alternatively, the content repository computing environment 109 can employ multiple computing devices that can be arranged, for example, in one or more server banks, computer banks, or other arrangements. The computing devices can be located in a single installation or can be distributed among many different geographical locations. For example, the content repository computing environment 109 can include multiple computing devices that together form a hosted computing resource, a grid computing resource, and/or any other distributed computing arrangement. In some cases, the content repository computing environment 109 can operate as at least a portion of an elastic computing resource where the allotted capacity of processing, network, storage, or other computing-related resources can vary over time. The content repository computing environment 109 can also include or be operated as one or more virtualized computer instances.

The content repository computing environment 109 can be operated by an entity that is a third party relative to the user of the client device 106 and/or the entity that operates the enterprise computing environment 103. The storage provider can be a public cloud provider offering data storage to the public as a service. In other words, the storage provider can provide data storage for multiple users and entities, including the users of the client devices 106 and/or the entity that operates the enterprise computing environment 103. A user of a client device 106 and/or the entity that operates the enterprise computing environment 103 can enroll in the data storage service using a user account that is separate from a user account associated with the enterprise computing environment 103, or an enterprise user account. In other words, a user account that is used to access the content repository is separate from an enterprise user account that is used to access the enterprise computing environment 103.

A storage provider data store 146 stores data that is accessible to the enterprise computing environment 103. The storage provider data store 146 shown in FIG. 1 can be representative of multiple storage provider data stores 146. The storage provider data store 146 can store files and/or other data for several users associated with different enterprise computing environments 103.

The content repository computing environment 109 can execute a content repository system 149 and/or other systems. The content repository system 149 can facilitate and manage the storage of data in the storage provider data store 146. For example, the content repository system 149 can provide an application protocol interface (API) and/or any other suitable interface that facilitates communication between the content repository system 149 and the client device 106 and/or management service 119. In addition, the content repository system 149 can authenticate requests to store and/or retrieve data. Additionally, the content repository system 149 can perform load balancing processes to facilitate the transfer of data between the storage provider data store 146 and other components, for example.

Next, a description of examples of the operation of the various components in the networked environment 100 is provided. To begin, the user of the client device 106 and/or the entity that operates the enterprise computing environment 103 can establish a virtual content repository on behalf of a user associated with the enterprise. A virtual content repository can include a virtual remote file system in which the user can add, edit, remove, or otherwise manage files in a directory structure via the virtual content repository application 126, but the files are actually stored in one or more content repositories that are external to the enterprise computing environment 103. These external content repositories can include third party data storage services or systems that a user can establish in which the user is assigned data storage space in a content repository computing environment 109. To this end, the virtual content repository data 129 can include a representation of the directory structure of a virtual content repository associated with a user account.

The file management application 139 can allow a user to access files that are stored within a virtual content repository without requiring knowledge of where the files are stored. In other words, a user can be unaware of the fact that files stored in a virtual content repository accessed using the file management application 139 are stored in a third party content repository rather than in the data store 116 associated with the enterprise computing environment 103.

To create a folder or directory in association with a virtual content repository of a user, the file management application 139 can transmit request to create a directory within the virtual content repository to the virtual content repository application 126. The virtual content repository application 126 can then generate a representation of a folder. The folder can be represented within the user's virtual content repository. The virtual content repository application 126 can then transmit an identifier corresponding to the folder to the file management application 139.

To facilitate storage of files in content repositories that are external to the enterprise computing environment 103, the virtual content repository application 126 can obtain, from the file management application 139, an identification of one or more content repositories associated with the user and/or one or more authentication credentials associated with the one or more content repositories. The user can provide the authentication credentials through a user interface provided by the file management application 139. In other words, a user can associate his or her virtual content repository with one or more content repositories that are external to the enterprise computing environment 103. For example, the user can identify a content repository that is associated with the user as well as an authentication credential within the respective content repositories. In another example, an administrator can establish an account as well as authentication credentials within a content repository on behalf of the user using the management console 123. The account and authentication credentials can be associated with user account data 136 on behalf of the user.

To store a file in association with a virtual content repository of a user, the file management application 139 can generate a request to store a file in the virtual content repository associated with the user. The request can be transmitted to the virtual content repository application 126. In response to receiving the request, the virtual content repository application 126 can generate an entry 137 in the virtual content repository data 129 corresponding to the file submitted using the client device 106. The virtual content repository application 126 can also generate a storage plan 138 corresponding to the file. To generate a storage plan 138, the virtual content repository application 126 can identify one or more content repositories external to the enterprise computing environment 103 in which the file can be stored by the client device 106 or the file management application 139.

The storage plan 138 can include an indication of which of the content repositories associated with the user account data 136 can store the file, a filename and a storage location within the content repository. In some scenarios, the filename in a content repository can vary from the filename within the virtual content repository. Accordingly, the virtual content repository application 126 can transmit the storage plan 138 to the file management application 139. The storage plan 138 can include a uniform resource locator (URL) corresponding to the content repository in which the virtual content repository application 126 directs the file management application 139 to store the file. In some examples, the URL can be generated by the virtual content repository application 126 and can include a link to a content page or a programmatic API call used to store the file in the selected content repository.

The file management application 139 can store the file as directed by the storage plan 138 and can transmit an indication of the status of storing the file in the content repository to the virtual content repository application 126. For example, if storage of the file was successful, the file management application 139 can notify the virtual content repository application 126, which can update the entry 137 corresponding to the file to indicate that the file was stored within the selected content repository. If storage of the file by the file management application 139 was unsuccessful, the file management application 139 can transmit an indication that storage of the file in the content repository was not successful. In this scenario, the virtual content repository application 126 can generate another storage plan 138 identifying an alternative content repository in which the file management application 139 can store the file. Upon receiving an indication from the file management application 139 that storage of the file was successful, the virtual content repository application 126 can update the entry 137 corresponding to the file to indicate that the file was stored within the alternative content repository.

In some scenarios, the storage plan 138 can also include an indication that portions of the file can be stored in different content repositories. For example, a first portion of the file can be stored in a first content repository and a second portion of the file can be stored in a second content repository. As another example, the even bytes of the file can be stored in a first content repository and the odd bytes of the file can be stored in a second content repository. In such a scenario, the storage plan 138 corresponding to the entry 137 can indicate which portions of the file should be stored in which content repository associated with the user account data 136. Accordingly, in such a scenario, the storage plan 138 can include an indication of which portion of the file should be stored by the file management application 139 in the first content repository and which portion of the file should be stored by the file management application 139 in the second content repository. The file management application 139 can then attempt to store the portions of the files in the identified content repositories and transmit an indication of whether storage of the portions of the files in the respective was successful to the virtual content repository application 126. Accordingly, the storage plan 138 indicates how the file management application 139 can reassemble a file upon retrieval from the content repositories in which portions of the file are stored.

In one example, virtual content repository application 126 can determine an amount of storage remaining in a user's content repositories. An appropriate content repository can be selected based on available storage space. For example, the virtual content repository application 126 can identify which of a user's content repositories has the most remaining storage space or is consuming less than a threshold percentage of storage space and select one or more of the content repositories based on the amount of remaining storage space. The virtual content repository application 126 can identify the remaining storage space by transmitting a request using, for example, an API provided by the respective content repository computing environment 109.

In another scenario, the file management application 139 can encrypt a file prior to transmitting a request to store the file in a virtual content repository. Such a request can include an encryption key associated with the file. In one example, the virtual content repository application 126 can store the encryption key along with the entry 137 in the virtual content repository data 129 while generating a storage plan 138 that instructs the file management application 139 to store the encrypted file in one or more external content repositories. In this way, the virtual content repository application 126 can store an encryption key associated with a particular file that is virtually stored in the virtual content repository of a user. In this example, however, the one or more content repositories in which the file is actually stored do not have access to the encryption key. Additionally, should the virtual content repository application 126 become compromised and should the encryption key be accessed, the actual copy of the file is not compromised because it is stored in a content repository that is external to the enterprise computing environment 103.

In another scenario, the virtual content repository application 126 can encrypt a file on behalf of the file management application 139, where the file is provided in a request to store the file in the virtual content repository. The virtual content repository application 126 can encrypt the file and store the encryption key in the entry 137 for the file. The virtual content repository application 126 can transmit the encrypted file to the file management application 139 along with a storage plan 138 that indicates one or more content repositories in which the encrypted file or portions thereof should be stored. Similar to the above example, in this way, the virtual content repository application 126 can store an encryption key associated with a particular file that is virtually stored in the virtual content repository of a user while the one or more content repositories in which the file is actually stored do not have access to the encryption key.

In an additional scenario, the virtual content repository application 126 can generate an encryption key corresponding to a file on behalf of the file management application 139. The virtual content repository application 126 can receive a request from the file management application 139 to store a file in the virtual content repository. The virtual content repository application 126 can generate an encryption key that corresponds to the file and transmit the encryption key to the file management application 139 as a part of the storage plan 138. The file management application 139 can then encrypt the file using the encryption key and store the encrypted file in one or more content repositories as specified by the storage plan 138. The virtual content repository application 126 can store the encryption key associated with the file in an entry 137 associated with the file. The file management application 139 can also cache or store the encryption key on the client device 106. In this way, the encrypted file is stored in the one or more content repositories, which do not also have access to the encryption key.

In an additional scenario, the virtual content repository application 126 can generate multiple encryption keys corresponding to a file on behalf of the file management application 139. The multiple encryption keys can be used to encrypt different portions of the file that can be stored in multiple content repositories by the file management application 139. The virtual content repository application 126 can receive a request from the file management application 139 to store a file in the virtual content repository. The virtual content repository application 126 can generate encryption keys that correspond to the file and transmit the encryption keys to the file management application 139 as a part of the storage plan 138. The file management application 139 can then split the file and encrypt the portions of the file using the encryption keys as specified by the storage plan 138. The file management application 139 can then store the encrypted portions of the file in one or more content repositories as specified by the storage plan 138. The virtual content repository application 126 can store the encryption keys associated with the file in an entry 137 associated with the file. The file management application 139 can also cache or store the encryption keys on the client device 106. In this way, the encrypted file is stored in the one or more content repositories, which do not also have access to the encryption keys for the portions of the file.

In an additional scenario, the file management application 139 can generate an encryption key corresponding to a file. The virtual content repository application 126 can receive a request from the file management application 139 to store a file in the virtual content repository along with the encryption key. The virtual content repository application 126 can store the encryption key in an entry 137 corresponding to the file and generate a storage plan 138 for the file. The file management application 139 can then store the encrypted file in one or more content repositories as specified by the storage plan 138. The file management application 139 can also cache or store the encryption key on the client device 106. In this way, the encrypted file is stored in the one or more content repositories, which do not have access to the encryption key.

In one example, the virtual content repository application 126 can extract a filename as well as a directory within the virtual content repository of the file associated with a request to store the file. The virtual content repository application 126 can generate another filename and/or another directory name that can be associated with the storage plan 138 provided to the file management application 139. The filename and/or directory name can be randomly generated or generated using a cryptographic hash function to obfuscate the directory structure of the virtual content repository when the file is stored within the content repository. The entry 137 can include a mapping between the filename and/or directory name and the filename and directory provided with the request to store the file in the virtual content repository by the file management application 139.

The file management application can obtain a directory listing as well as a folder structure of the virtual content repository from the virtual content repository application 126. In this way, the file management application 139 can facilitate browsing of the directory structure of the virtual content repository. Additionally, a user can select a particular file within the directory structure to initiate download of the file from the virtual content repository. In response, the file management application 139 can generate a request to download the file from the virtual content repository that is transmitted to the virtual content repository application 126. In response to receiving such a request, the virtual content repository application 126 can identify an entry 137 corresponding to the file and identify a storage plan 138 associated with the entry 137. The virtual content repository application 126 can provide the storage plan 138, or an identification of one or more content repositories external to the enterprise computing environment 103 in which the file is stored.

The virtual content repository application 126 can transmit the storage plan 138 to the file management application 139, which can retrieve the file from the one or more content repositories. In one example, the file management application 139 can request an authentication credential associated with the content repository from a user via a user interface rendered by the client device 106 should an authentication credential be necessary to access the content. If the file management application 139 has obtained or previously stored the authentication credential, the file management application 139 can download the file from the one or more content repositories identified by the storage plan 138.

As noted above, multiple portions of a particular file can be stored in multiple content repositories. Accordingly, as indicated by the storage plan 138 for a particular file, the file management application 139 can obtain the various portions of the file from the various content repositories and reassemble the file. The virtual content repository application 126 can also provide an encryption key that can be stored in an entry 137 along with the storage plan 138 to the file management application 139. The file management application 139 can then decrypt the file using the encryption key.

Figure 2A:
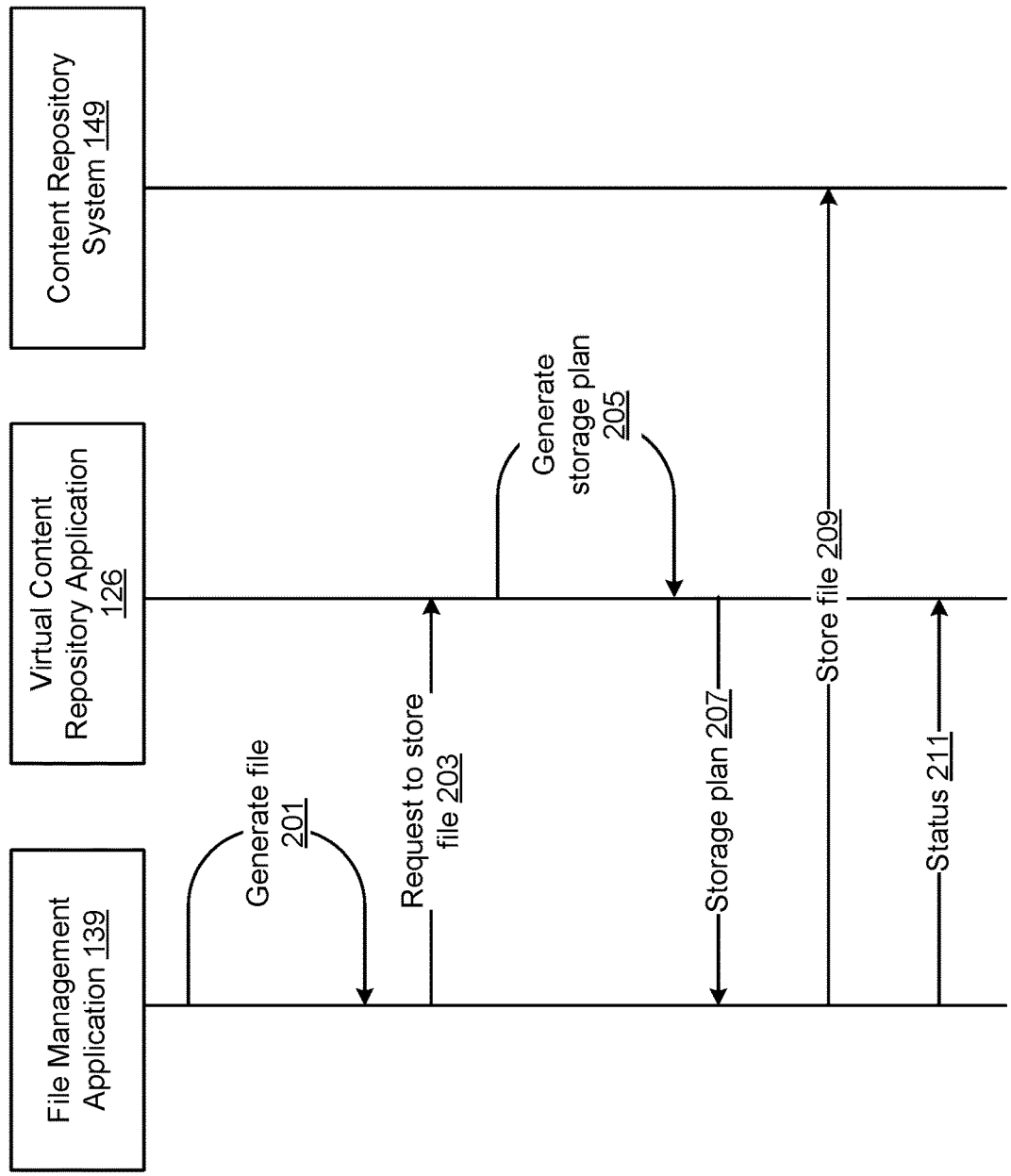
FIGS. 2A-3B are sequence diagrams illustrating interactions between elements.

Reference is now made to FIG. 2A, which depicts a sequence diagram illustrating one example of interactions between an enterprise computing environment 103, client device 106 and one or more content repository computing environments 109. FIG. 2A illustrates an example of storing a file in a virtual content repository of a user associated with an enterprise user account. As shown in FIG. 2A, the file management application 139 can generate a file as shown by step 201. At step 203, the file management application 139 can generate a request to store the file that is transmitted to the virtual content repository application 126. The file management application 139 can also authenticate a user with user account data 136 to ensure a trusted client device 106 issued the request.

As denoted by step 205, the virtual content repository application 126 can generate a storage plan 138 associated with the file received from the file management application 139. The storage plan 138 can be generated by identifying a content repository that is associated with a particular enterprise user account in which the file can be stored. A content repository can be selected based upon an amount of remaining storage in a storage quota associated with a user account in the content repository. At step 207, the storage plan 138 can be transmitted to the file management application 139. In response to receiving the storage plan 138, the file management application 139 can store the file as denoted by step 209 in the content repository identified by the storage plan 138. At step 211, the virtual content repository application 126 can transmit an indication of whether storage of the file in the content repository was successful or unsuccessful.

Figure 2B:
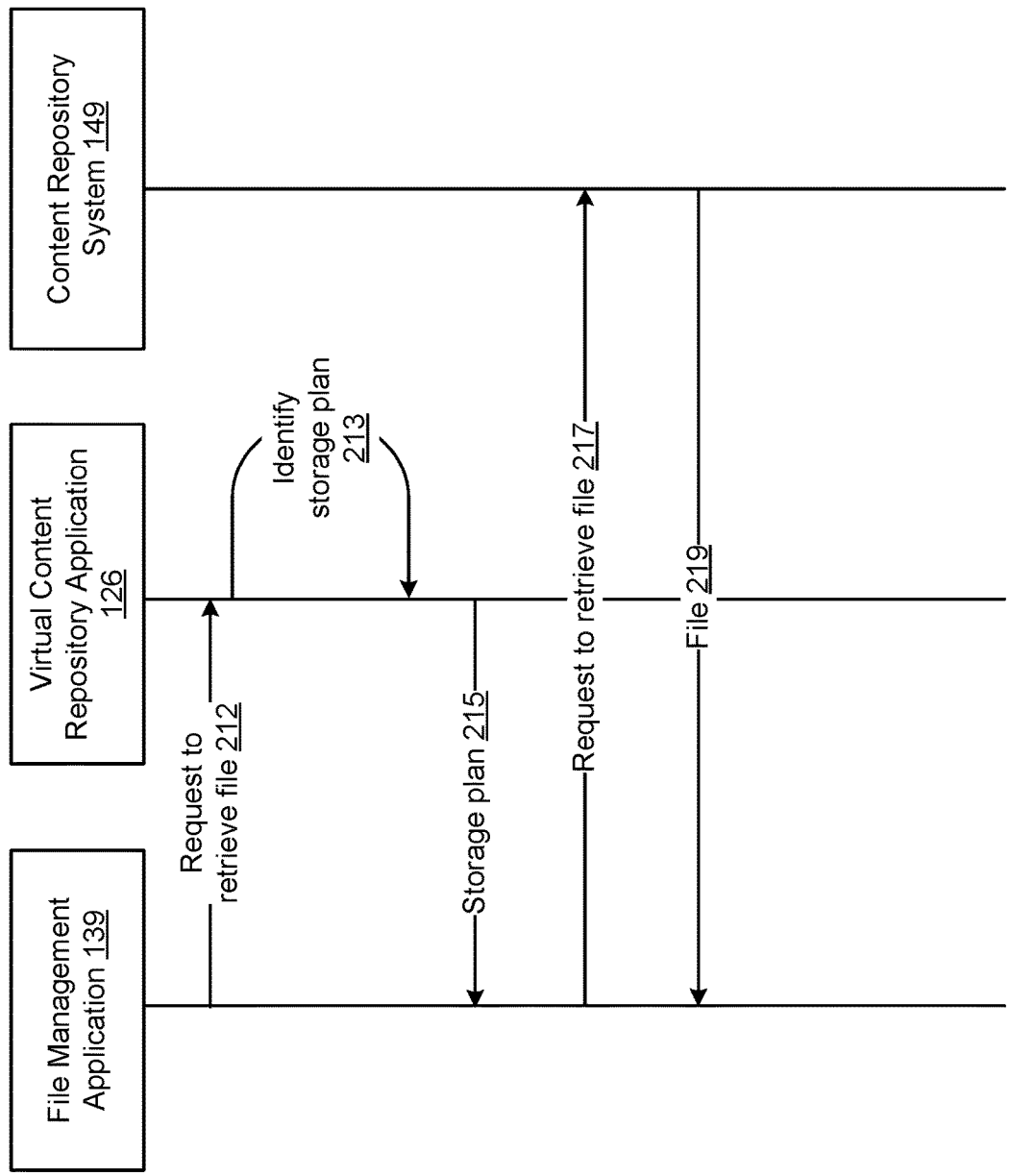

Reference is now made to FIG. 2B, which depicts a sequence diagram illustrating one example of interactions between an enterprise computing environment 103, client device 106 and one or more content repository computing environments 109 according to one example. FIG. 2B illustrates an example of the retrieval of a file from a virtual content repository of a user associated with an enterprise user account. As shown in FIG. 2B, at step 212, the file management application 139 can generate a request to retrieve a file that is transmitted to the virtual content repository application 126. The request can include information identifying a user along with authentication credentials. The virtual content repository application 126 can authenticate a user and verify that a user has access rights to the requested file. If the user is not authorized, an error message can be returned to the client device 106.

At step 213, the virtual content repository application 126 can identify a storage plan 138 associated with the file and transmit the storage plan 138 to the file management application 139 at step 215. In some scenarios, the file management application 139 can cache a storage plan 138 previously obtained from the virtual content repository 126 rather than requesting an additional copy. As denoted by step 217, the file management application 139 can transmit a request to retrieve the file from the content repository identified by the storage plan 138. At step 219, the content repository can transmit the requested file to the file management application 139.

Figure 3A:
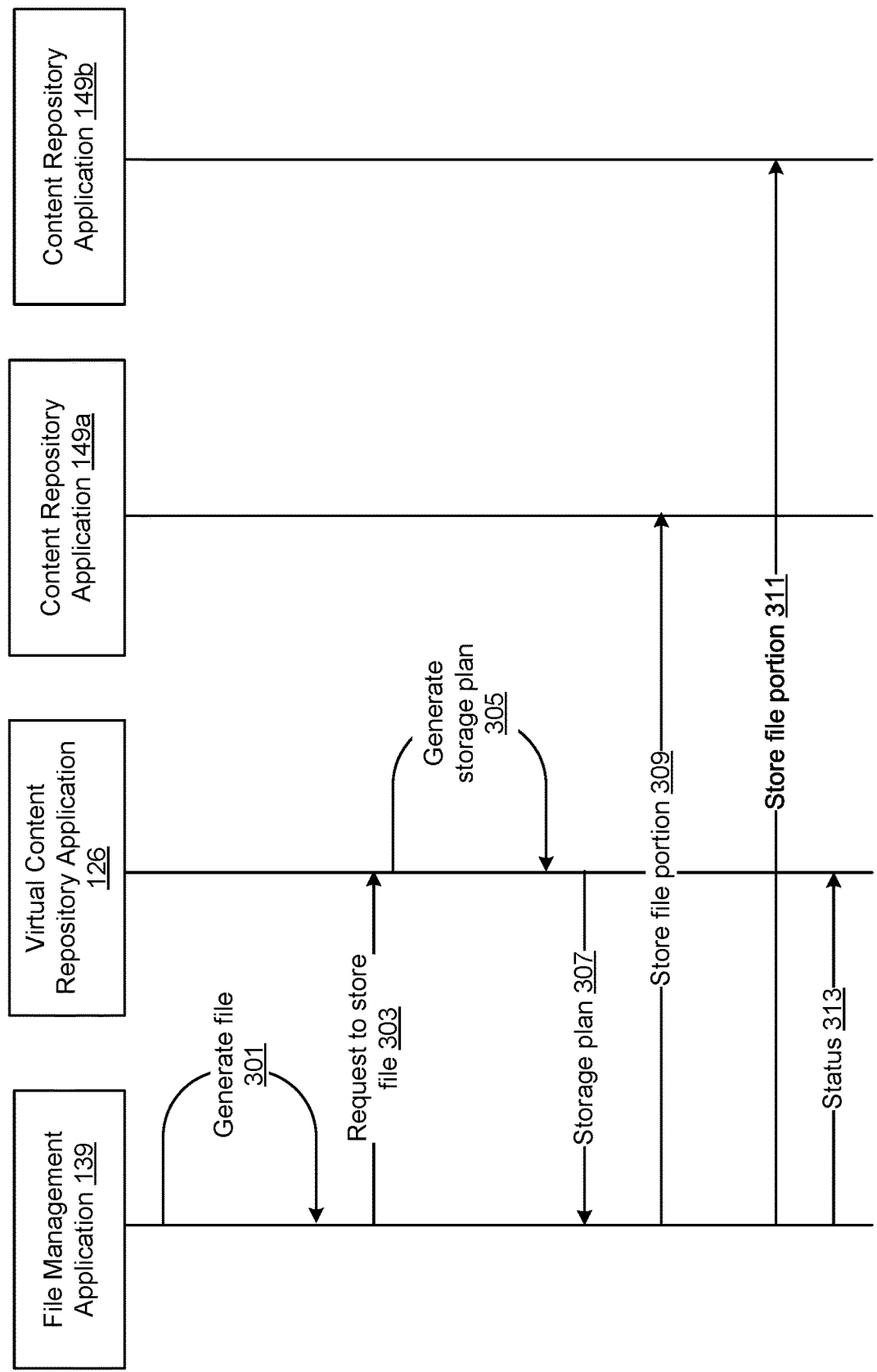

Reference is now made to FIG. 3A, which depicts a sequence diagram illustrating one example of interactions between an enterprise computing environment 103, client device 106 and one or more content repository computing environments 109. FIG. 3A illustrates an example of the storing of a file in a virtual content repository of a user associated with an enterprise user account where portions of the file are stored in multiple content repositories. As shown in FIG. 3A, the file management application 139 can generate a file as shown by step 301. At step 303, the file management application 139 can generate a request to store the file that is transmitted to the virtual content repository application 126.

As denoted by step 305, the virtual content repository application 126 can generate a storage plan 138 associated with the file received from the file management application 139. The storage plan 138 can identify one or more content repositories that are associated with a particular enterprise user account in which the file can be stored. In some scenarios, a portion of the file can be stored in various content repositories. In other scenarios, a copy of the file can be mirrored in multiple content repositories. As noted above, a content repository can be selected based upon an amount of remaining storage in a storage quota associated with a respective user account in the content repository. At step 307, the storage plan 138 can be transmitted to the file management application 139. In response to receiving the storage plan 138, the file management application 139 can store a portion of the file as indicated by the storage plan 138 in one of the identified content repositories as denoted by step 309.

Similarly, the file management application 139 can store a portion of the file as indicated by the storage plan 138 in another one of the identified content repositories as denoted by step 311. More than two content repositories can also be employed as a part of a storage plan 138. At step 313, the virtual content repository application 126 can transmit an indication of whether storage of the file in the content repository was successful or unsuccessful.

Figure 3B:
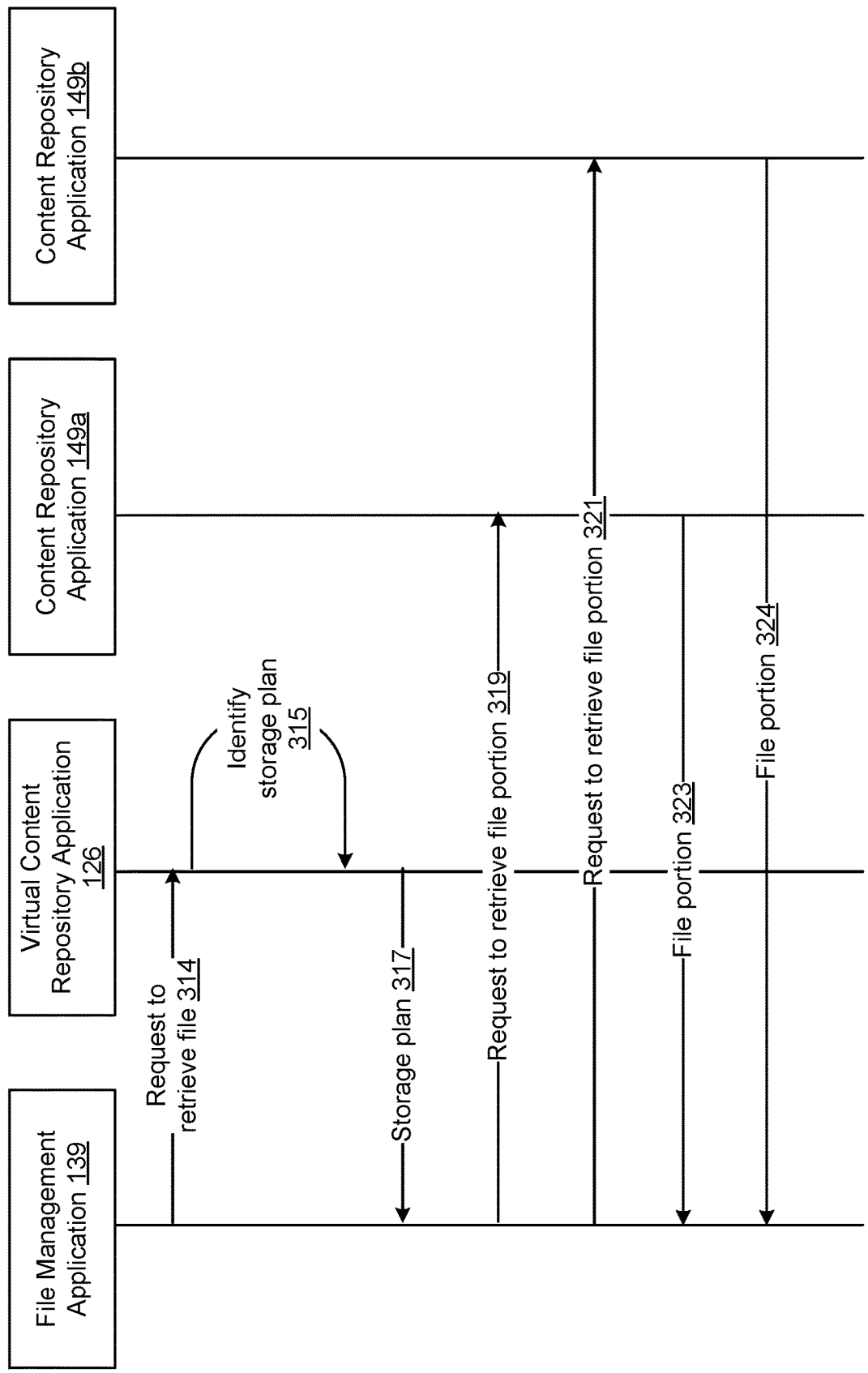

Reference is now made to FIG. 3B, which depicts a sequence diagram illustrating one example of interactions between an enterprise computing environment 103, client device 106 and one or more content repository computing environments 109 according to one example. FIG. 3B illustrates an example of retrieving a file from a virtual content repository. As shown in FIG. 3B, the file management application 139 can generate a request to retrieve a file that is transmitted to the virtual content repository application 126 at step 314. At step 315, the virtual content repository application 126 can identify a storage plan 138 associated with the file. The storage plan 138 associated with the file is transmitted to the file management application 139 at step 317. If the storage plan is already stored by the file management application 129, such as when the same user previously stored and then requested the file, steps 315 and 317 could be omitted. As denoted by step 319, the file management application 139 can transmit a request to retrieve a first portion of the file from one of the content repositories identified by the storage plan 138. As denoted by step 321, the file management application 139 can transmit a request to retrieve another portion of the file from another one of the content repositories identified by the storage plan 138. At steps 323 and 324, the content repositories can transmit the requested portions of the file to the file management application 139.

Figure 4:
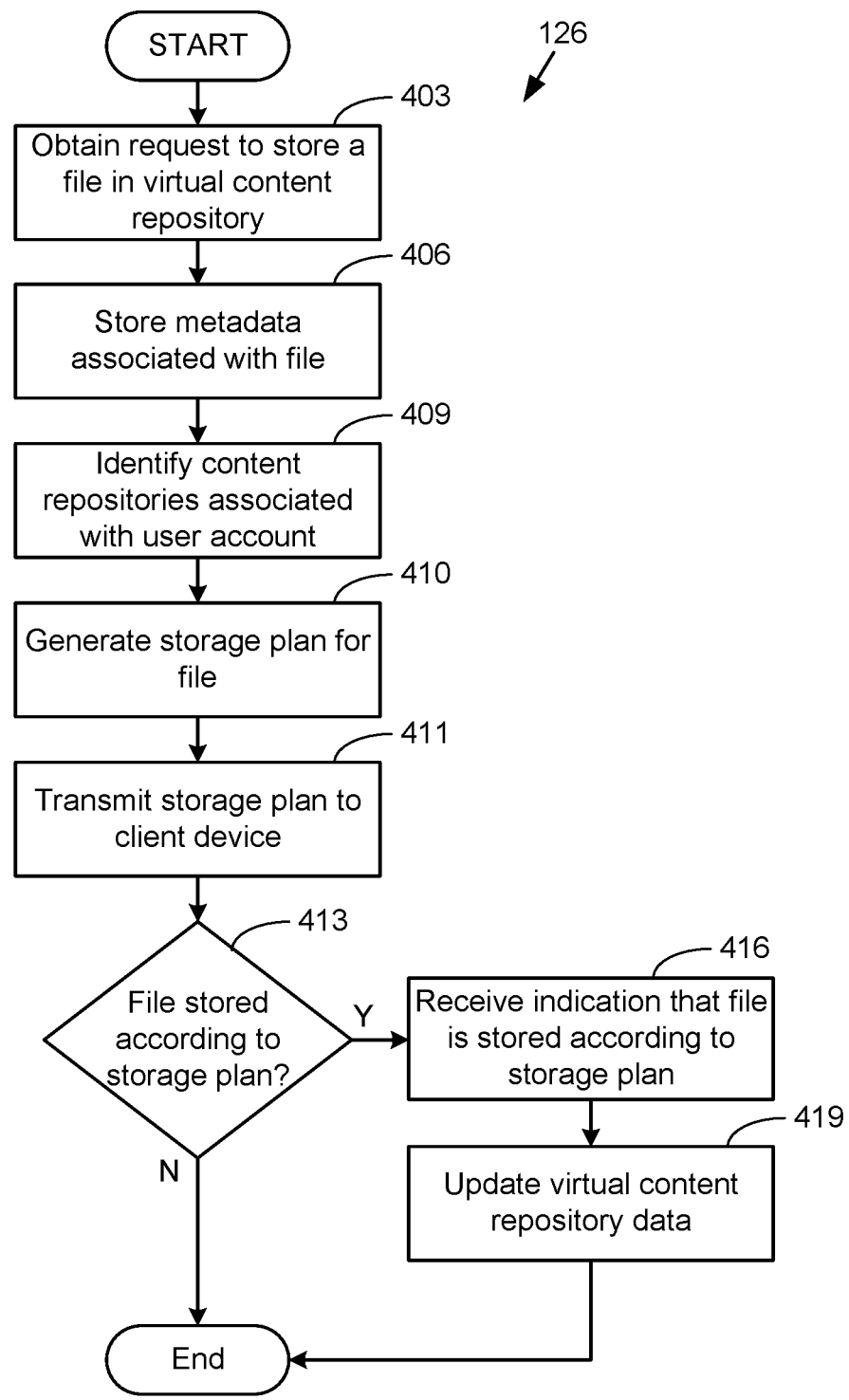
FIG. 4 is a flowchart illustrating an example of functionality implemented by the virtual content repository application according to various examples.

Referring next to FIG. 4, shown is a flowchart that provides one example of the operation of a portion of the virtual content repository application 126 according to various examples. As an alternative, the flowchart of FIG. 4 can be viewed as depicting an example of elements of a method implemented in the enterprise computing environment 103 (FIG. 1) according to one or more examples.

Beginning at step 403, the virtual content repository application 126 obtains a request to store a file in a virtual content repository associated with a particular user and an enterprise user account. At step 406, the virtual content repository application 126 can store metadata associated with the file in an entry 137 in the virtual content repository data 129. Metadata can include, for example, a filename associated with the file, access permissions, an encryption key associated with the file, or any other data or parameters associated with the file. At step 409, the virtual content repository application 126 can identify one or more content repositories associated with the enterprise user account in which the file is to be stored. At step 410, the virtual content repository application 126 generates a storage plan 138 associated with the file, where the storage plan 138 identifies one or more content repositories in which the file or portions thereof can be stored by the file management application 139.

At step 411, the virtual content repository application 126 can transmit the storage plan 138 to the file management application 139 from which the request to store the file was received. At step 413, if the file was stored according to the storage plan 138 by the file management application 139, then at step 416, the virtual content repository application 126 can receive a confirmation and update the entry 137 corresponding to the file at step 419. If the file was not stored according to the storage plan 138, the virtual content repository application 126 can avoid updating the entry 137 corresponding to the file and execute steps 409-419 until successfully storing the file in another content repository. Thereafter, the process can proceed to completion.

Figure 5:
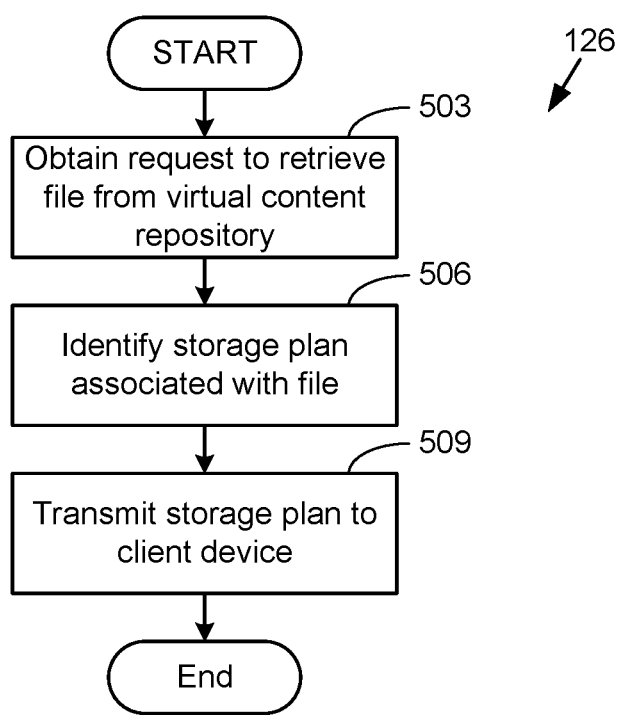
FIG. 5 is a flowchart illustrating an example of functionality implemented by the virtual content repository application according to various examples.

With reference to FIG. 5, shown is a flowchart that provides an example of a portion of the operation of the virtual content repository application 126 according to various examples. In particular, FIG. 5 provides an example of the virtual content repository application 126 handling a request to retrieve a file received from a client device 106 executing the file management application 139. As an alternative, the flowchart of FIG. 5 can be viewed as depicting an example of elements of a method implemented in the management service 119 according to one or more examples.

At step 503, the virtual content repository application 126 can obtain a request to retrieve a file from a virtual content repository associated with an enterprise user account. At step 506, the virtual content repository application 126 can identify a storage plan 138 associated with the file. As noted above, the storage plan 138 can identify one or more content repositories external to the enterprise computing environment 103 in which the file or portions thereof are stored. At step 509, the virtual content repository application 126 can transmit the storage plan to a client device executing the file management application 139, which can retrieve the file as indicated by the storage plan 138.

Figure 6:
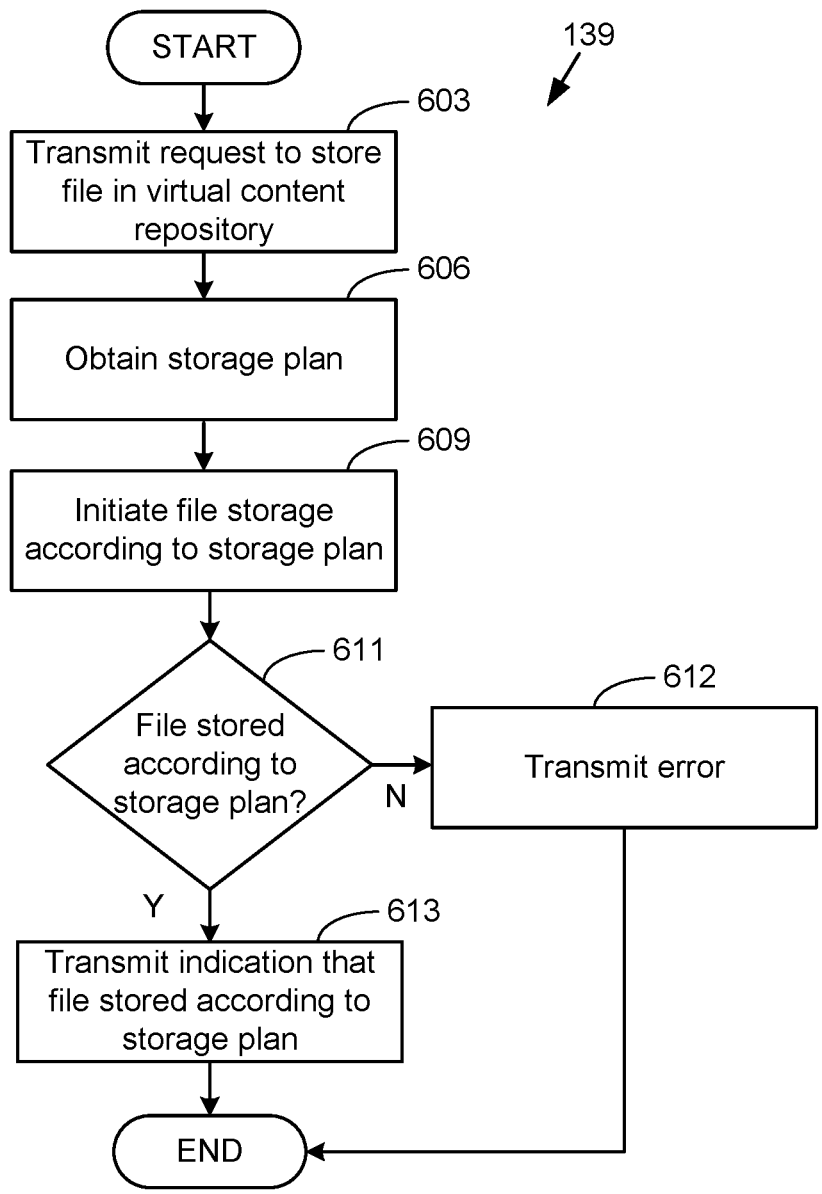
FIG. 6 is a flowchart illustrating an example of functionality implemented by the file management application according to various examples.

With reference to FIG. 6, shown is a flowchart that provides an example of a portion of the operation of the file management application 139 according to various examples. In particular, FIG. 6 provides an example of the file management application 139 storing a file in a virtual content repository according to one scenario. It is understood that the flowchart of FIG. 6 provides merely an example of the many different types of functional arrangements that can be employed to implement the portion of the operation of the file management application 139 as described herein.

At step 603, the file management application 139 can transmit a request to store a file in a virtual content repository associated with a particular enterprise user account. At step 606, the file management application 139 can obtain a storage plan 138 from the virtual content repository application 126. At 609, the file management application 139 can initiate storage of the file in the one or more content repositories identified by the storage plan 138. At step 611, the file management application 139 can determine whether the file was successfully stored according to the storage plan 138. If not, then at 612, the file management application 139 can transmit an error or an indication that the file was not stored according to the storage plan 138. Otherwise, at step 613, the file management application 139 can transmit an indication that the file was successfully stored in the one or more content repositories at step 613. Thereafter, the process can proceed to completion.

Figure 7:
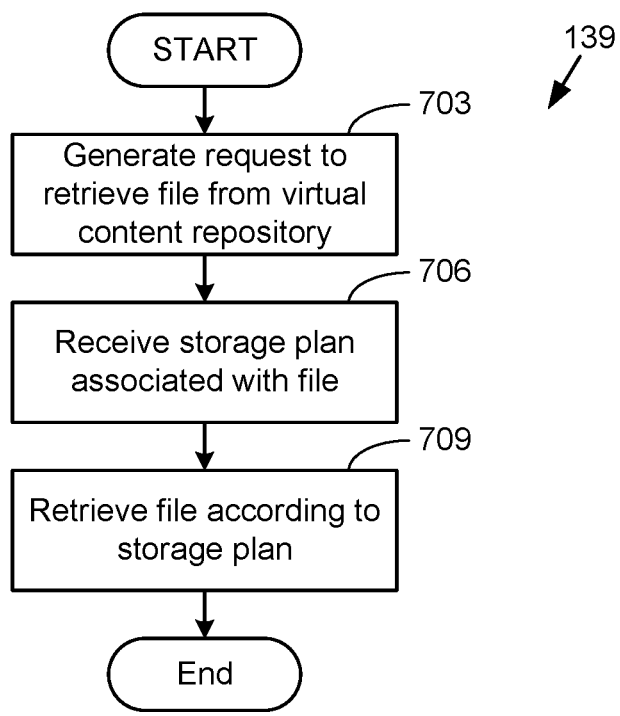
FIG. 7 is a flowchart illustrating an example of functionality implemented by the index service according to various examples.

With reference to FIG. 7, shown is a flowchart that provides an example of a portion of the operation of the file management application 139 according to various examples. In particular, FIG. 7 provides an example of the file management application 139 retrieving a file from a virtual content repository according to one scenario. At step 703, the file management application 139 can generate a request to retrieve a file from a virtual content repository associated with an enterprise user account. At step 706, the file management application 139 can receive a storage plan 138 associated with the file from the virtual content repository application 126. As noted above, the storage plan 138 can identify one or more content repositories external to the enterprise computing environment 103 in which the file or portions thereof are stored. At box 709, the file management application 139 can retrieve the file according to the storage plan 138.

The flowcharts of FIGS. 4-7 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language and/or machine code that includes machine instructions recognizable by a suitable execution system, such as a processor in a computer system or other system. If embodied in hardware, each element can represent a circuit or a number of interconnected circuits that implement the specified logical function(s).

Although the flowcharts show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages might be added to the logical flow described herein, for purposes of enhanced utility, accounting, performance measurement, troubleshooting aid, etc. It is understood that all such variations are within the scope of the present disclosure.

The enterprise computing environment 103, the client device 106, the content repository computing environment 109, and/or other components described herein can each include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data and/or components that are executable by the one or more processors of the processing circuit. For example, the management service 119, the file management application 139, the content repository system 149, and/or other components can be stored in one or more storage devices and be executable by one or more processors. Also, a data store, such as the data store 116 and/or the storage provider data store 146, can be stored in the one or more storage devices.

The management service 119, the file management application 139, the content repository system 149, and/or other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology can include, for example, one or more microprocessors, discrete logic circuits having logic gates for implementing various logic functions upon an application of one or more data signals, application specific integrated circuits (ASICs) having appropriate logic gates, and programmable logic devices (e.g., field-programmable gate array (FPGAs) and complex programmable logic devices (CPLDs)).

Also, one or more or more of the components described herein that include software or program instructions can be embodied in any non-transitory computer-readable medium for use by or in connection with an instruction execution system such as, for example, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, and flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying a program for providing file management, the program being executable by a client device that, when executed by the client device, causes the client device to at least:

transmit, based on a user request to access a directory structure of a virtual content repository of a file management user interface, a file request to a management service, the file request comprising an authentication credential for a user account associated with the management service, wherein the client device authenticates with the management service based at least in part on the authentication credential;

in an instance in which the user request is successfully authenticated, receive, from the management service, a storage plan that identifies a content repository, and includes: an encryption key, and a mapping that includes:
- a directory name for a file in the directory structure of the virtual content repository used for identifying a location of the file in the virtual content repository and viewing the file in the file management user interface, and
- a randomly-generated directory name utilized for storing the file, encrypted with the encryption key, in the content repository and separately from a computing environment of the virtual content repository;

cache, on the client device, the storage plan wherein the encryption key is unexposed to the content repository to prevent the stored encrypted file from being compromised by unauthorized access to virtual content repository or the encryption key, based on the stored encrypted file being stored separately from the computing environment of the virtual content repository in a remote directory of the content repository corresponding to the randomly-generated directory name;

transmit, from the client device to the content repository, a file access request for access to the file in the content repository,
- the file access request comprising the randomly-generated directory name,
- the content repository comprising a remote computing environment that identifies and provides the requested access to the file based on the transmitted randomly-generated directory name from the file access request,
- wherein the randomly-generated directory name, which corresponds to the remote directory containing the file within the content repository, is different from the directory name in the virtual content repository to obfuscate the directory structure for storage of the file in the content repository, which is operated by a third party relative to the virtual content repository and the client device; and in an instance in which the requested access to the file is provided by the content repository, present the file via the file management user interface and within the directory structure of the virtual content repository, based on the mapping between the directory name and the randomly-generated directory name.

2. The non-transitory computer-readable medium of claim 1, wherein the storage plan comprises a uniform resource locator (URL), wherein the URL corresponds to the content repository and identifies a storage location within the content repository.

3. The non-transitory computer-readable medium of claim 1, wherein the program further causes the client device to obtain the authentication credential from a user, and wherein access to the file is restricted before the authentication credential is obtained.

4. The non-transitory computer-readable medium of claim 1, wherein the program further causes the client device to permit access to the file by a first application executed by the client device and prevent access to the file by a second application executed by the client device.

5. The non-transitory computer-readable medium of claim 1, wherein the program further causes the client device to generate a user interface that shows the file in association with a representation of a directory within the virtual content repository of the management service.

6. The non-transitory computer-readable medium of claim 5, wherein the program further causes the client device to transmit a request to associate the content repository with the virtual content repository of the management service, wherein the request to associate the content repository with the virtual content repository comprises a second authentication credential and an identification of the content repository.

7. The non-transitory computer-readable medium of claim 1, wherein the storage plan further comprises an encryption key for the file, and the program further causes the client device to cache, on the client device, the storage plan comprising: the encryption key for the file, and the mapping between the directory name and the randomly-generated directory name.

8. A method for providing file management using a program executed on a client device, the method comprising:

transmitting, based on a user request to access a directory structure of a virtual content repository of a file management user interface, a file request to a management service, the file request comprising an authentication credential for a user account associated with the management service, wherein the client device authenticates with the management service based at least in part on the authentication credential;

in an instance in which the user request is successfully authenticated, receiving, from the management service, a storage plan that identifies a content repository, and includes: an encryption key, and a mapping that includes:
- a directory name for a file in the directory structure of the virtual content repository used for identifying a location of the file in the virtual content repository and viewing the file in the file management user interface, and
- a randomly-generated directory name utilized for storing the file, encrypted with the encryption key, in the content repository and separately from a computing environment of the virtual content repository;

caching, on the client device, the storage plan wherein the encryption key is unexposed to the content repository to prevent the stored encrypted file from being compromised by unauthorized access to virtual content repository or the encryption key, based on the stored encrypted file being stored separately from the computing environment of the virtual content repository in a remote directory of the content repository corresponding to the randomly-generated directory name;

transmitting, from the client device to the content repository, a file access request for access to the file in the content repository,
- the file access request comprising the randomly-generated directory name,
- the content repository composing a remote computing environment that identifies and provides the requested access to the file based on the transmitted randomly-generated directory name from the file access request, wherein the randomly-generated directory name, which corresponds to the remote directory containing the file within the content repository, is different from the directory name in the virtual content repository to obfuscate the directory structure for storage of the file in the content repository, which is operated by a third arty relative to the virtual content repository and the client device; and in an instance in which the requested access to the file is provided by the content repository, presenting the file via the file management user interface and within the directory structure of die virtual content repository, based on the mapping between the directory name and the randomly-generated directory name.

9. The method of claim 8, wherein the storage plan comprises a uniform resource locator (URL), wherein the URL corresponds to the content repository and identifies a storage location within the content repository.

10. The method of claim 8, further comprising obtaining the authentication credential from a user, and wherein access to the file is restricted before the authentication credential is obtained.

11. The method of claim 8, further comprising permitting access to the file by a first application executed by the client device and preventing access to the file by a second application executed by the client device.

12. The method of claim 8, wherein the program further causes the client device to generate a user interface that shows the file in association with a representation of a directory within the virtual content repository of the management service.

13. The method of claim 12, wherein the program further causes the client device to transmit a request to associate the content repository with the virtual content repository of the management service, wherein the request to associate the content repository with the virtual content repository comprises a second authentication credential and an identification of the content repository.

14. The method of claim 8, wherein the program further causes the client device to transmit a request to create a directory within the virtual content repository of the management service.

15. A system for providing file management, comprising:
a client device;
a memory of the client device comprising a program executable by the client device that, when executed by the client device, causes the client device to at least:
transmit, based on a user request to access a directory structure of a virtual content repository of a file management user interface, a file request to a management service, the file request comprising an authentication credential for a user account associated with the management service, wherein the client device authenticates with the management service based at least in part on the authentication credential;
in an instance in which the user request is successfully authenticated, receive, from the management service, a storage plan that identifies a content repository, and includes: an encryption key, and a mapping that includes:
a directory name for a file in the directory structure of the virtual content repository used for identifying a location of the file in the virtual content repository and viewing the file in the file management user interface, and a randomly-generated directory name utilized for storing the file, encrypted with the encryption key, in the content repository and separately from a computing environment of the virtual content repository;

cache, on the client device, the storage plan wherein the encryption key is unexposed to the content repository to prevent the stored encrypted file from being compromised by unauthorized access to virtual content repository or the encryption key, based on the stored encrypted file being stored separately from the computing environment of the virtual content repository in a remote directory of the content repository corresponding to the randomly-generated directory name;

transmit, from the client device to the content repository, a file access request for access to the file in the content repository, the file access request comprising the randomly-generated directory name, the content repository comprising a remote computing environment that identifies and provides the requested access to the file based on the transmitted randomly-generated directory name from the file access request, wherein the randomly-generated directory name, which corresponds to the remote directory containing the file within the content repository, is different from the directory name in the virtual content repository to obfuscate the directory structure for storage of the file in the content repository, which is operated by a third party relative to the virtual content repository and the client device; and in an instance in which the requested access to the file is provided by the content repository, present the file via the file management user interface and within the directory structure of the virtual content repository, based on the mapping between the directory name and the randomly-generated directory name.

16. The system of claim 15, wherein the storage plan comprises a uniform resource locator (URL), wherein the URL corresponds to the content repository and identifies a storage location within the content repository.

17. The system of claim 15, wherein the program further causes the client device to obtain the authentication credential from a user, and wherein access to the file is restricted before the authentication credential is obtained.

18. The system of claim 15, wherein the program further causes the client device to permit access to the file by a first application executed by the client device and prevent access to the file by a second application executed by the client device.

19. The system of claim 15, wherein the program further causes the client device to generate a user interface that shows the file in association with a representation of a directory within the virtual content repository of the management service.

20. The system of claim 19, wherein the program further causes the client device to transmit a request to associate the content repository with the virtual content repository of the management service, wherein the request to associate the content repository with the virtual content repository comprises a second authentication credential and an identification of the content repository.

* * * * *